United States Patent

[11] 3,573,365

[72] Inventor George E. Anderson
Indianapolis, Ind.
[21] Appl. No. 770,728
[22] Filed Oct. 25, 1968
[45] Patented Apr. 6, 1971
[73] Assignee RCA Corporation

[54] VIDEO MUTING CIRCUITS
4 Claims, 2 Drawing Figs.

[52] U.S. Cl. .......... 178/7.3
[51] Int. Cl. .......... H04n 5/16
[50] Field of Search .......... 178/5.6, 6, 7.3 (DC)

[56] References Cited
UNITED STATES PATENTS
3,011,017 11/1961 Obler et al. .......... 178/5.8

*Primary Examiner*—Richard Murray
*Assistant Examiner*—Barry Leibowitz
*Attorney*—Eugene M. Whitacre

ABSTRACT: A kinescope used in a television receiver is automatically blanked when the receiver is being tuned by a motor driven tuning arrangement. The activation of the tuning mechanism automatically applies a suitable potential to the kinescope, via a video amplifier stage, of a sufficient magnitude to blank the display so that transients which are developed during the tuning operation do not appear on the viewing screen.

INVENTOR
GEORGE E. ANDERSON
BY Eugene M. Whitacre
ATTORNEY

VIDEO MUTING CIRCUITS

VIDEO MUTING CIRCUITS

This invention relates to television receivers and more particularly to a video-blanking circuit for eliminating transient display during the tuning of a television receiver.

In television receivers including a motor driven-tuning system, transient signals are received as the receiver is tuned from one channel to the next causing disturbing flashes, lines and transient interference to appear on the face of the picture tube. In the case of a color receiver, the tuning operation produces additional disturbances which appear on the face of the color picture tube as color flashes, lines, etc.

In order to eliminate these undesireable effects it is desirable to blank the kinescope during this channel change period. When a desired channel is reached, the picture will roll or slip sync, and appear with improper contrast. This continues until the sync separator circuits and AGC systems recover from the transients experienced by these circuits during the channel selection sequence.

It is therefore an object of the present invention to provide a simple and inexpensive arrangement for blanking the kinescope of a television receiver during channel selection.

In accordance with one embodiment of the present invention, a blanking bias voltage is applied to at least one video amplifier stage in a video amplifier chain. The video chain forms a DC path from a source of video signals to a control electrode of a kinescope. The change in bias is accomplished during the activation of a channel selector control included in the television receiver. Upon activation of the channel selector control, a motor is caused to automatically tune the channel selection apparatus of the receiver. Simultaneously with this a bias source is coupled to the amplifier chain, said source being of a level sufficient to cutoff beam current flow in the kinescope and hence darken or remove the display, via the DC coupled video amplifier. When the desired channel is tuned in, the bias source is automatically removed after a predetermined time permitting the kinescope beam current to again flow. The predetermined time being sufficient to further provide stabilization of the AGC and synchronization circuits.

Figure 1:
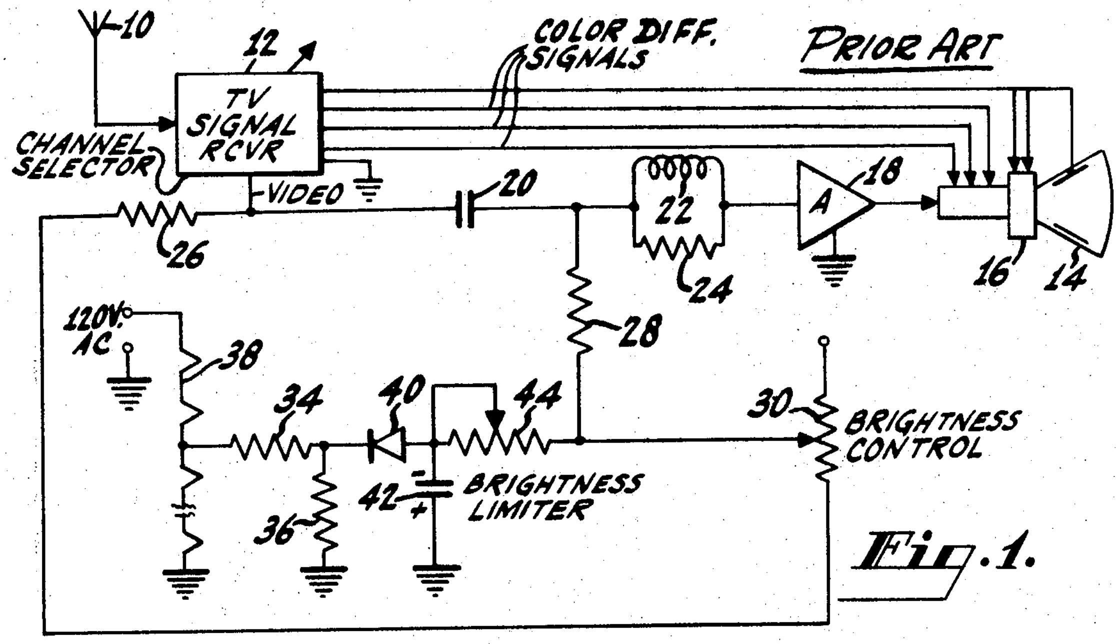
Figure 2:
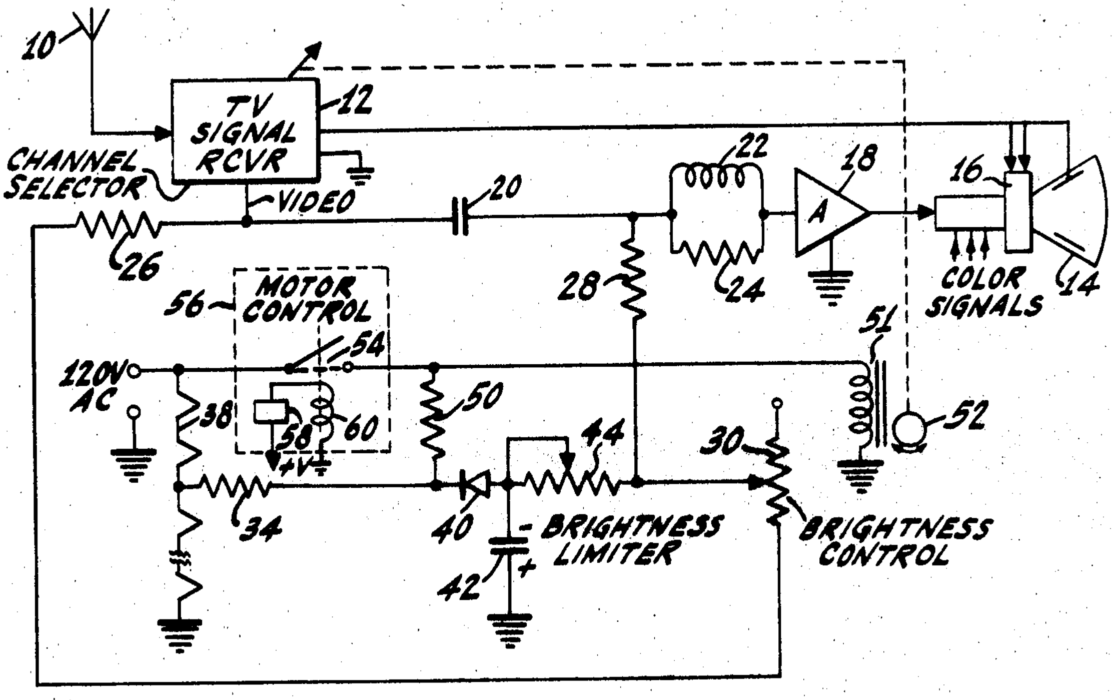

The invention is defined in the claims. The manner in which one embodiment of the invention operates to achieve the object of blanking the kinescope of a television receiver will now be explained in greater detail by reference to the drawings in which:

FIG. 1 is a schematic circuit diagram, partially in block form, of an existing television receiver having means for providing brightness control; and FIG. 2 is a schematic circuit diagram of a television receiver having a video blanking circuit according to this invention.

Referring now to FIG. 1 there is shown a television antenna 10 for receiving transmitted radio frequency (RF) signals and coupling the same to the input terminals of a television signal receiver 12. The television signal receiver 12 contains suitable circuitry for converting the RF signal to an intermediate frequency signal (IF) and thence to a video signal. Such a television receiver 12 has provisions for tuning or selecting a separate desired one, of a plurality of television channels, according to and under control of the preferences of the viewer. This feature has been shown broadly in the FIGURE by means of the adjustable arm designated as channel selector and coupled to the television signal receiver 12.

Monochrome and color television receivers perform many similar and well-known functions such as sync separation, automatic gain control, sound reproduction, synchronized deflection generation for providing a raster, generation of suitable operating potentials for the kinescope circuitry employed therein and so on.

The kinescope 14 of FIG. 1 has coupled thereto a deflection yoke 16 for application of the necessary vertical and horizontal deflection waveforms for providing a raster on the face of the kinescope 14. A lead is shown coupled to the ultor electrode of the kinescope 14 from the television signal receiver 12 to indicate the application to the ultor of a suitable high voltage. Such a voltage is usually developed in the horizontal deflection circuitry included in receiver 12.

The output from the signal receiver 12, referenced as video, is applied to a video amplifier 18 through a capacitor 20 and a peaking circuit comprising a coil 22 shunted by a resistor 24. The capacitor 20 affords an AC coupling path to the video signal amplifier 18. In order to preserve the DC component of the video signal, which will increase the effective fidelity of the picture, a portion of the video DC signal is coupled to the video amplifier 18 via the path provided by resistors 26,28 and 30. Resistor 30 is a brightness control potentiometer. For a minimum resistance setting of resistor 30, resistor 26 is connected to resistor 28 to provide least attenuation of the DC components of the video signal.

In television receivers having a DC coupled video-amplifying system, the brightness of the picture on the face of the kinescope has been controlled by varying the bias voltage applied to one of the video amplifiers. The bias voltage is usually derived from the line deflection system. Particularly, in color television receivers, the derivation of the bias supply voltage in this manner may result in an unstable brightness condition when the receiver is operating under high brightness conditions which tend to overload such deflection circuitry.

To alleviate this problem certain color television receivers such as the RCA CTC–22 and CTC–36 utilize the brightness arrangement shown in FIG. 1. For a complete circuit schematic of such a color television receiver see a pamphlet entitled "RCA Television Service Data" (1968) No. T7, RCA Sales Corporation, 600 North Sherman Drive, Indianapolis, Ind. A brightness bias voltage for video amplifier 18, is obtained by a resistive divider comprising resistors 34 and 36 connected across a portion of the receiver filament string 38.

A diode 40 has a cathode electrode coupled to the junction between resistors 34 and 36 and an anode electrode coupled to ground through the filter capacitor 42. This circuit is a half-wave rectifier for providing a negative DC potential across capacitor 42 which is used as the brightness bias source. The bias voltage across capacitor 42 is utilized by coupling the negative terminal of capacitor 42 to the brightness control potentiometer 30 via the brightness limiter potentiometer 44.

Although the invention, to be described herein may be used in monochrome receivers it is more likely to be used in a color receiver and will therefore be described in connection therewith. In this respect, FIG. 1 shows three leads labeled color difference signals emanating from receiver 12 and coupled to the kinescope 14. Such leads, for example, are energized by the color difference signals; (B–y), (R–Y), and (G–Y), developed by chroma circuitry included in the receiver 12, and are connected to the three grid electrodes of the kinescope 14, which may be a three gun shadow mask device. Video amplifier 18 has the output terminal thereof (Y signal) coupled to the three respective cathodes of the kinescope 14. These grid and cathode signals control the conduction of the three separate beams generated by the shadow mask kinescope 14.

The series filament string 38 found in a color receiver as above, is provided to eliminate the need of a relatively expensive power transformer. Since resistors 44 and 30 are relatively large the capacitor 42 may be relatively small in magnitude while still providing proper filtering of the half-wave rectified signal. Resistor 34 serves to limit the series current in event of diode 40 failure and thus protects the filament string 38 from excessive current surges.

Since the voltage across the filament string 38 varies with power line, or 120 volts AC the DC across capacitor 42 will also vary. Line voltage increases result in an increase in the high voltages coupled to the kinescope 14, as derived from the line deflection circuits. This therefore results in an increase of the brightness of the display.

However, as the AC line voltage increases the negative bias across capacitor 42 also increases causing the video amplifier 18 to go towards cutoff. This action increases the kinescope cathode voltage in a positive direction and hence shifts the kinescope bias towards beam cutoff. The function of the high voltage circuits in combination with the illustrated brightness arrangement results in the two effects cancelling each other, thus maintaining the kinescope brightness level relatively constant. This operation is especially desireable in a color television receiver because of the stringent requirements placed upon the high voltage circuitry, while further safeguarding the desired operating characteristics of the kinescope 14.

Potentiometer 44 is designated as a brightness limiter and is a factory adjustment which establishes the maximum brightness bias current. Thus the viewer is prevented from setting the control 30 in a region which might overload the circuitry of the receiver. Such loading would thereby distort the display and otherwise cause abnormal receiver operation.

Accordingly, the circuit shown in FIG. 1 allows each receiver, utilizing the apparatus shown therein, to be preadjusted to known standards at the factory. This technique therefore allows good production quality control since all chassis can be made to perform at the same maximum brightness without significant overloads of the high voltage supply. In such receivers a motor tuned operation would produce transients which in turn would cause different brightness levels, color line transients, etc., to appear on the face of the kinescope 14 as well as loss of sync, AGC and so on.

FIG. 2 shows a color receiver similar to that of FIG. 1 but provided with circuit connections for blanking the kinescope during motor tuning of the receiver. A motor control unit 56 contains a relay coil 60 and a control switch 58. The switch 58 causes a DC voltage, indicated as $+V$, to be applied to the relay coil 60 causing switch contact 54 to close. The relay contact 54 has one terminal connected to the high potential side of the 120 volt power line. The other terminal of relay 54 is coupled to one terminal of a field winding 51 of a suitable motor. The other terminal of the winding 51 is connected to a point of reference potential such as ground. Activation of the relay 60 causes power to be applied to the terminals of the motor. The motor has a rotor 52 which is caused to turn by the activation of the field winding 51. The rotor 52 is mechanically coupled by means of a gear train or other device to the channel selector switch of the receiver, causing the receiver to be tuned through the various television channels. The activation of the channel selection motor activates audio muting circuits in the audio section of the receiver (not shown). For greater detail of remote control units and motorized tuning see an RCA publication "Color Television Service Data" (1966) No. T18.

Resistor 50 forms part of a voltage divider with resistor 34 and serves to provide an AC voltage at the junction between resistors 34 and 50 suitable for producing the necessary DC brightness supply voltage across capacitor 42. Resistor 50, instead of being returned directly to ground, as was resistor 36 of FIG. 1, is returned to ground through the low DC resistance of the motor winding 51. The residual current flowing through the motor winding 51 is small in magnitude and insufficient to operate the motor or to cause any appreciable heating thereof.

During the tuning operation, the remote relay 60 is activated (by a remote transmitter or other means) contact 54 closes, applying full line voltage to the field winding 51 which serves to activate the motor. This causes the rotor 52 to drive the channel selecting mechanisms of the receiver. The full line voltage is also applied to the series combination of resistors 50 and 34 and the portion of the filament string between the resistor 34 and ground. The half-wave rectifier circuit comprising diode 40 and capacitor 42 now has an increased voltage applied thereto as determined by the division of resistor 50 and resistor 34. Capacitor 42 then charges to a much higher negative potential then during normal operation which thus serves to cutoff the kinescope 14 through the video amplifier 18. The voltage across capacitor 42 is of a sufficient magnitude during this time to cutoff the kinescope 14 independent of the setting of the brightness control 30. As soon as the desired channel is tuned in, contact 54 opens and capacitor 42 discharges to its normal bias voltage through resistor 44 and the series combination of resistors 30 and 26 and the DC resistance of a path in the receiver 12 to ground. This time constant is sufficiently long to permit the sync, AGC and color circuits to stabilize before the display can actually be seen by the viewer. The action of video muting then has the pleasing effect for the viewer of having the picture turned off during channel selection or motorized tuning and reappear again on a preprogrammed channel. The picture when appearing is perfectly stable. The circuitry as shown further serves to eliminate visual interference which would normally occur when the channel selector is caused to pass through the unused channel positions of the receiver.

A circuit operating in accordance with the present invention utilized the following components.

| | |
|---|---|
| Resistor **26** | 220 Kilohms |
| Resistor **28** | 100 Kilohms |
| Potentiometer **30** | 250 Kilohms |
| Resistor **34** | 56 Kilohms |
| Resistor **50** | 33 Kilohms |
| Potentiometer **44** | 2.5 Megohms |
| Capacitor **20** | 0.1 microfarads |
| Capacitor **42** | 0.15 microfarads |
| Relay **60** | 1000 ohm coil, 5 ampere contacts |
| Motor **51** | 120 *V* AC shaded pole |
| Diode **40** | Silicon diode 150 PIV |

I claim:

1. In a television receiver, including means for receiving any one of a plurality of transmitted radio frequency television signals, selectively operated means for processing any selected given one of said radio frequency signals and means for providing a video signal containing both a DC and AC component representative of a portion of a television picture content from said processed signal, said receiver including a kinescope, said kinescope having a control electrode for application thereto of a suitable signal for varying the brightness of a display on the viewing screen thereof and including means for selecting said means for processing to operate on a desired given one of said radio frequency signals, in combination therewith, comprising:

a. a video amplifier having an input responsive to said video signal and an output coupled to said control electrode of said kinescope for controlling said brightness according to both the AC and DC components of said video signal;

b. switching means coupled to said selectively operated means to operate the same to select one of said radio frequency signals;

c. a brightness biasing network coupled to said input of said video amplifier for controlling the DC operating point thereof and therefore the brightness of said kinescope display; and d. means connecting said brightness biasing network to said switching means for applying a biasing level to said video amplifier sufficient to blank said kinescope, when said selectively operated means is operated.

2. In a television receiver having a radio frequency section which by means, including a channel selector switch, is capable of receiving any desired one of a plurality of radio frequency television signals, said receiving including means for converting said any one radio frequency signal to a video signal, and a kinescope for producing a video display, said kinescope having a control electrode for applying a voltage thereto for controlling the brightness of said display in accordance with the magnitude of said voltage, in combination therewith:

a. selectively operated means coupled to said channel selector switch for automatically driving said switch, to cause said receiver to be receptive to one of said radio frequency signals, when said selectively operated means is energized by a suitable operating potential;

b. a source of operating potential of a magnitude sufficient to operate said selectively operated means;

c. a switch coupled between said source and said selectively operated means to apply said operating potential to said selectively operated means in a first position and to remove said potential therefrom in a second position;

d. a video amplifier, including a DC coupling path, said amplifier having an output coupled to said electrode of said kinescope and an input responsive to said video signal, for applying to said electrode both the AC and DC components of said video signal;

e. a brightness supply including a voltage divider at an input thereof and having said input coupled to said source of operating potential and an output of said brightness supply coupled to said input of said video amplifier, said voltage divider supplying a potential to said brightness supply at said input which is less than said magnitude sufficient to operate said selectively operated means; and f. means coupled between said brightness supply and said switch to apply said full potential of said source to said brightness supply when said switch is operated in said first position, said potential being of a magnitude to blank said kinescope via said video amplifier.

3. In combination with a television receiver of the type having a series connected filament string for energizing the filaments of a plurality of vacuum tubes utilized therein from a power line source, said receiver including a video amplifier having a DC path coupled to a control electrode of a kinescope for applying an amplified video signal to said electrode and for varying the brightness of the kinescope display in accordance with the biasing of said video amplifier, said receiver including a motor driven tuner, comprising:

a. a switch coupled between said power line source and a terminal of said motor winding;

b. a voltage divider coupled between a portion of said filament string and said motor winding, whereby a first potential level appears across said voltage divider when said switch is opened and a second potential appears across said divider when said switch is closed; and c. a brightness bias source including a rectifier coupled between said voltage divider and said video amplifier whereby said video amplifier receives said DC proportional to said first potential level when said switch is opened and a second DC proportional to said second potential level when said switch is closed, said second DC level being of a sufficient magnitude to blank said kinescope display.

4. In combination with a television receiver of the type having a series connected filament string for energizing the filaments of a plurality of vacuum tubes utilized therein, from a power line source, said receiver including a video amplifier having a DC path coupled to a control electrode of a kinescope for applying an amplified video signal to said electrode and for varying the brightness of the kinescope display in accordance with the biasing of said video amplifier, said receiver including a motor having a field winding, said motor used for driving the receiver tuner, comprising:

a. switching means operable in a first position for coupling said field winding of said motor to said power line source for energizing said motor and in a second normal position for inactivating said motor;

b. a voltage divider coupled between a portion of said filament string and said motor winding; and c. a rectifier circuit having an input coupled to a portion of said voltage divider and an output coupled to said video amplifier, said rectifier circuit providing at said output a first DC potential for said first switching means position corresponding to the energization of said motor and a second DC potential for said second switch position, whereby said DC path of said video amplifier reduces said brightness of said kinescope display to blank said display when said switching means is in said first position and to permit a normal brightness raster to appear during said second switching means position.